United States Patent Office 3,260,999
Patented July 12, 1966

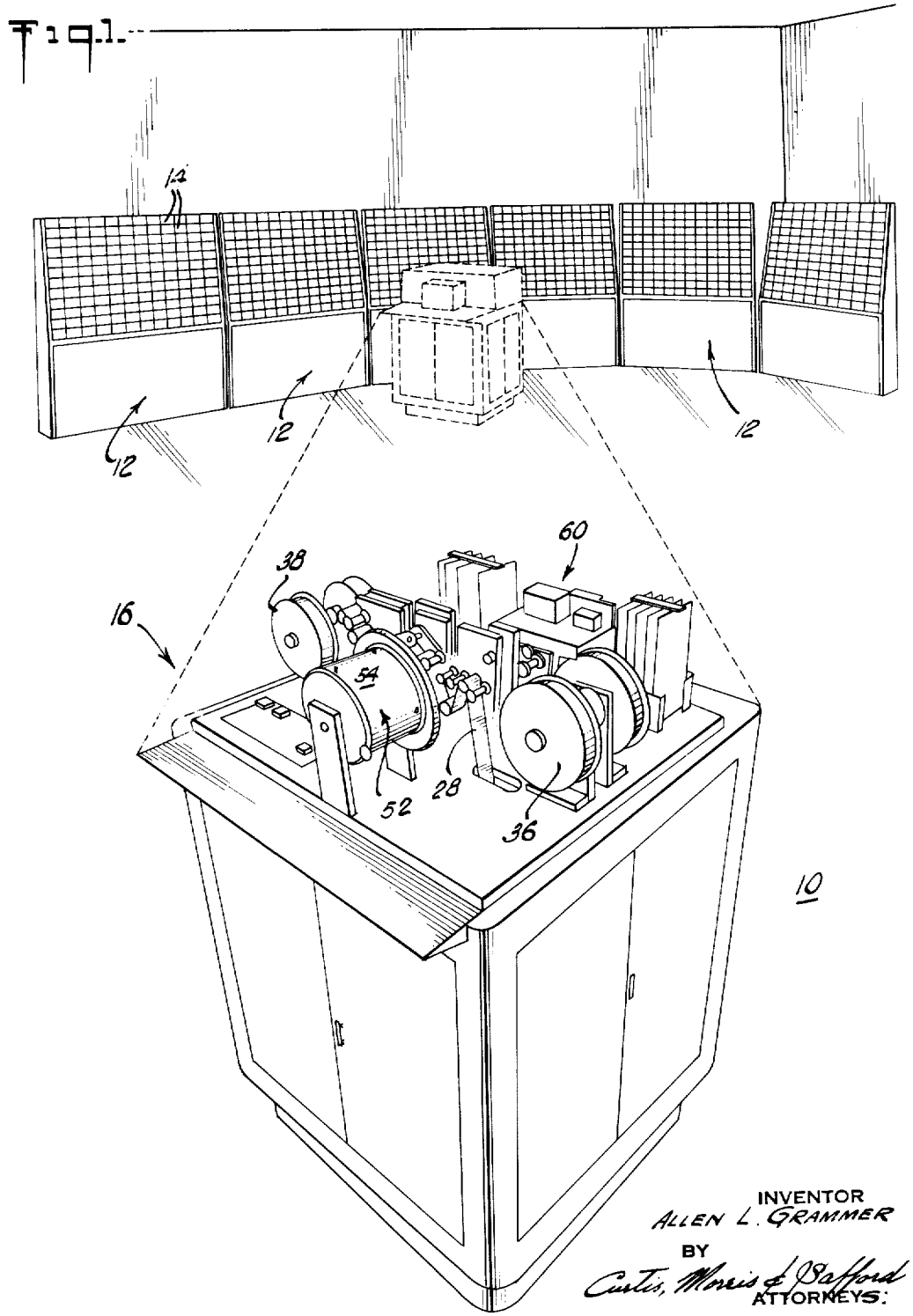

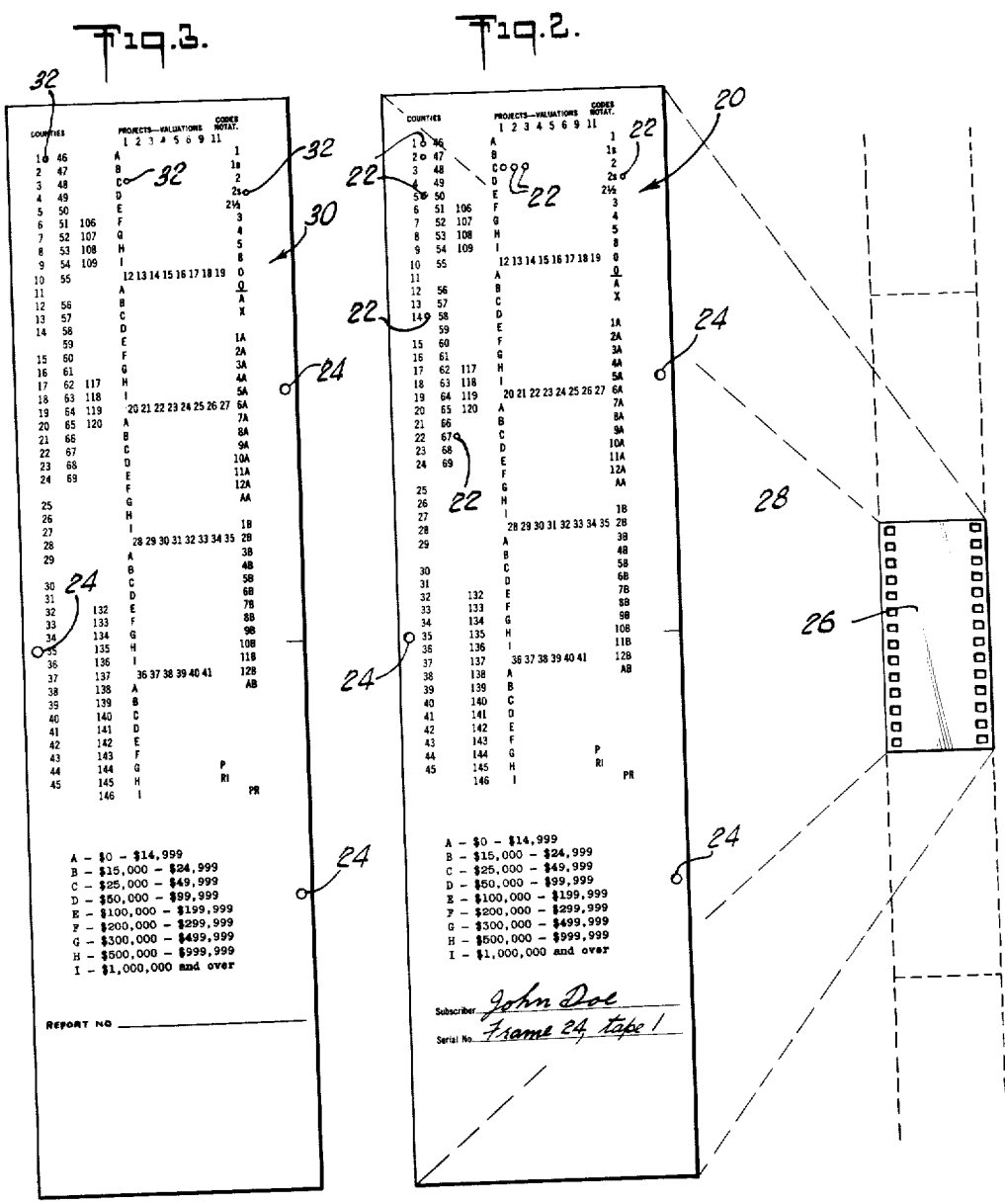

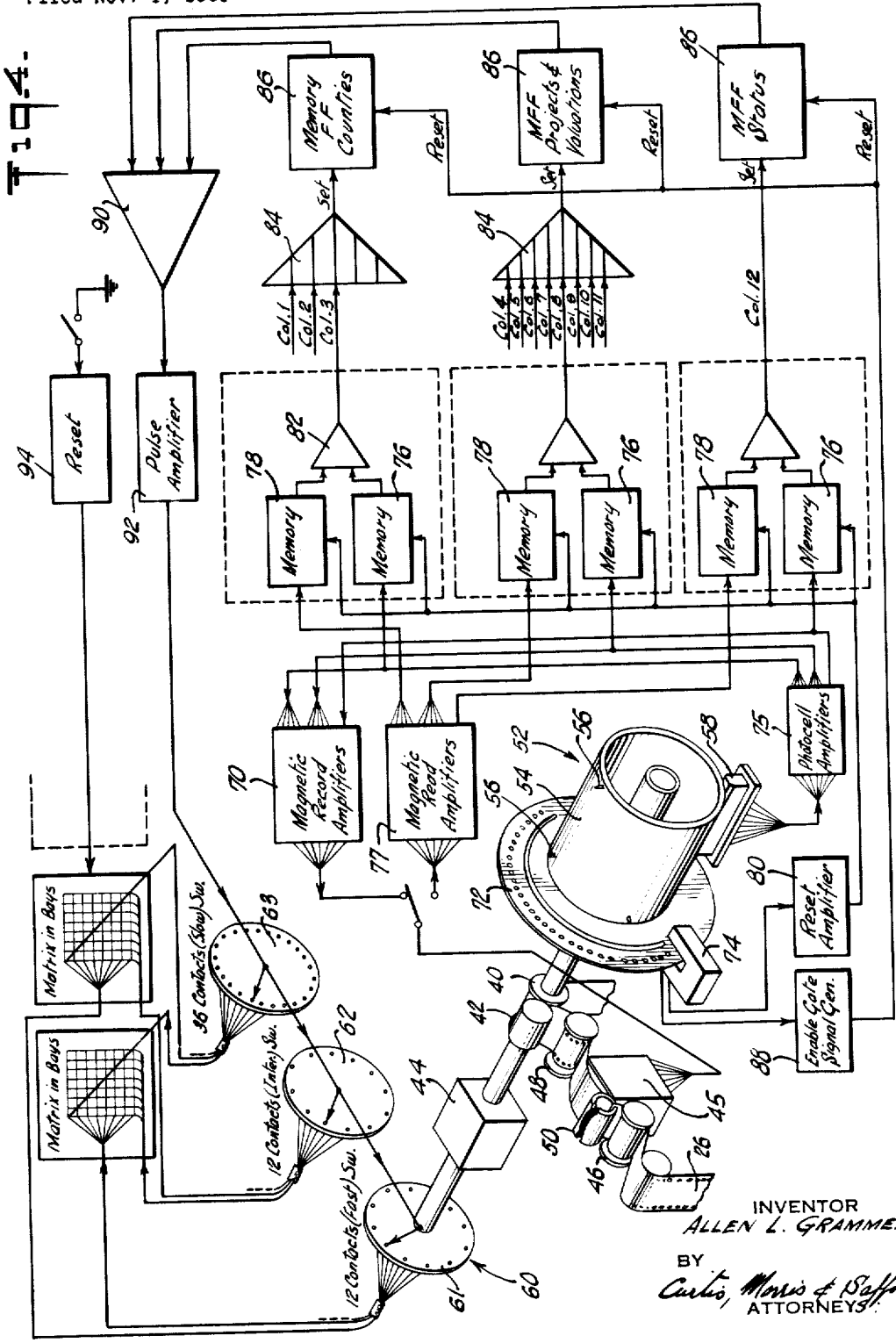

3,260,999
ELECTRONIC SELECTOR SYSTEM
Allen L. Grammer, 62 Undercliff Road, Montclair, N.J.
Filed Nov. 1, 1961, Ser. No. 149,253
2 Claims. (Cl. 340—172.5)

This invention relates to a high speed information handling system.

An object of this invention is to provide a more effective way of storing and subsequently retrieving certain types of information.

A further object is to provide simple and relatively inexpensive equipment for such information handling.

A more specific object is to provide a high speed system for the scanning of lists of subscribers so that publications or reports of various kinds can be issued to the particular subscribers who desire to receive them.

These and other objects will in part be understood from and in part pointed out in the description given hereinafter.

There is a pressing need for a simple to use, yet fast and reliable system for storing and finding information in connection with many kinds of business activity. For instance in the issuing of a business report, such as a report on the status of a particular building project in a certain location, to selected ones of subscribers (e.g. various contractors who pay to receive this and similar reports) from among a much larger number of subscribers, it is of course necessary to select accurately the names of all those subscribers who wish to receive the particular report. But it is equally necessary not to issue this report to subscribers who are not interested in receiving it. Otherwise, so to speak, the wheat would be lost among the chaff.

Now, where many thousands of subscribers and hundreds of reports a week are involved, a staggering amount of detailed work in mailing out the right reports to the right subscribers is involved. Previously this work has been done manually by dozens of clerks who scanned the subscriber lists and mentally checked the type or types of report ordered by each subscriber against the particular report being issued. At best though this is a slow tedious procedure and many mistakes are made. Moreover, the company which prepares and issues these reports has the constant bother and considerable expense of training new clerks to replace those who leave. Finally, human capability being what it is, for a given size clerical force, only so many reports can be handled in a given time, and so this manual operation is unable to cope with sudden or seasonal peaks in the work load.

In spite of the fact that many sizes and varieties of computers and data processing systems are available today, for certain types of information handling, such as the one outlined above, the tremendous cost of most of these systems makes it economically impossible for a small company to buy one. Furthermore, the operation and programming of these computers are usually so complex that only trained specialists can operate them. This further helps to put these systems economically well beyond the reach of most small and medium size businesses.

The present invention provides a relatively simple and inexpensive information handling system which nonetheless is completely reliable and sufficiently fast for its intended purpose. This new system does not require an expert to operate it, and in fact it maintains the directness and simplicity, from the standpoint of human understanding, of the manual operation it replaces. The cost of this new system is low enough so that it is available even to small businesses. For the sake of illustration, the invention will be described in connection with the issuing of business reports as outlined above.

In accordance with the invention, in one specific embodiment thereof, the names of all subscribers to a business report service, for example, are stored in sequence on a magnetic tape. For each subscriber there is stored in coded form on the tape the type or types of reports he wants to receive. The data of the various subscribers are placed on the tape in chronological order and, as will appear, are assigned a number corresponding simply to their numerical position on the tape. Thus, the adding of a subscriber to the magnetic tape "list" is most easily accomplished and the list is open ended, that is, there is no need to re-number or re-arrange the other subscribers to fit in a new one.

To place the data concerning a given subscriber on the tape, a punched card is prepared, and this in turn is "read" onto the tape. The punched card itself is easily prepared by a clerk in the usual course of business, and afterward the card may be stored in a file where it is physically available to record, for example, subsequent changes in the type of report the subscriber wishes to receive. Of course, in the daily issuing of reports, these subscriber punched cards need not be referred to.

When a given report has been prepared, a corresponding punched card is also prepared, this card containing in coded form the information (i.e. type of construction, location, cost, etc. of a given building project) contained in the report. This punched card has coded areas (namely holes) which coincide with corresponding areas of one or more subscribers cards. Where these areas completely coincide, this identifies the subscribers to which this report should be sent. To pick out these subscribers, the magnetic tape listing all of them is scanned at very high speed, each frame on the tape being compared against the punched card for this particular report. Whenever congruence or matching between the coded information on a frame of the tape with the information on the punched card is detected, a signal is generated.

Now, each subscriber is assigned a numbered box, or pigeon hole, and when a given numbered frame on the tape matches the punched card being compared with it, a signal light at the box corresponding to this particular subscriber and frame position is turned on. At the end of the tape, the lights of the boxes of all those subscribers who should receive this particular report will have been turned on. Thereafter, it is an easy task to place a printed copy of the report in each lighted box. After this has been done, these lights are turned off and the above procedure is repeated for the next report, and so on. At the end of the day, the contents of each box are mailed to the subscriber. In this way, a large number of reports can be distributed among a large number of subscribers in a much shorter time than previously, and with far less chance of error.

A better understanding of the invention together with a fuller appreciation of its may advantages will best be gained from the following description given in connection with the accompanying drawings wherein:

FIGURE 1 is a perspective view of a selector system embodying the invention,

FIGURE 2 is a card listing a subscriber's name and address and punched in accordance with several types of reports the subscriber wants to receive, the information on this card also being stored on a frame of a magnetic tape, FIGURE 3 is a similar card which has been punched according to the information contained in a report to be issued, and FIGURE 4 is a schematic representation of the electronic circuit of the system of FIGURE 1.

The selector system 10 shown in FIGURE 1 comprises a number of bays or banks, generally indicated at 12, of subscriber's boxes 14. These boxes are numbered in sequence and each contains the name and address of a respective subscriber. Each box has an indicator light associated with it. Positioned in front of bays 12 is a console 16 which contains a magnetic tape transport and associated electronic equipment for selecting or lighting the boxes into which copies of a given report should be placed. This equipment will be described in greater detail shortly.

FIGURE 2 shows the form of a code card 20 which also has printed numbers and letters on its face. A card, such as this, is filled out for each subscriber, and is punched by a clerk with holes 22, these holes being arranged in a pattern to indicate the type or types of reports desired by this subscriber. Placed along the side edges of the card are positioning holes 24 by means of which the card can be indexed on an optical reader, as will be explained in connection with FIGURE 4. The information carried by the coding holes 22 on card 20 is recorded in the same pattern on a frame, such as frame 26, of a magnetic tape 28. This tape is, for example, standard perforated 35 mm. Mylar film coated with magnetic oxide. Each frame on the tape has a numerical position, and is indexed by the side perforations along the tape. Thus, starting at an initial point on the tape, it is easily possible by counting frames to identify each particular one. After the information on a subscriber's card 20 has been recorded in a particular frame on the magnetic tape, the frame number is written on the card which may then be placed in a storage file.

FIGURE 3 shows a card 30, similar to card 20, which is prepared along with a given report. This card 30 is coded by a clerk with punched holes 32 identifying the particular report. For the sake of illustration, holes 32 on card 30 are placed to correspond with certain ones of the code holes 22 in card 20. Thus, when the coded information on frame 26 of magnetic tape 28 is compared with the information coded on card 30, a match or correspondence will occur and this will cause the lighting of the subscriber box corresponding to frame 26. Thereafter, a copy of this report will be placed in the box. Subscriber's card 20 has been illustrated as having more code holes 22 than will match against code holes 32 of card 30. This indicates that the subscriber wishes to receive several reports in addition to the one identified by card 30.

As seen in FIGURE 1, the magnetic tape transport carried by console 16 comprises a takeup reel 36 and a playback reel 38. Stretched between these reels is a length of magnetic tape, such as tape 28. Referring also to FIGURE 4, the magnetic tape in the region between reels 36 and 38 passes over a drive sprocket 40 and beneath a clamp roller 42. Sprocket 40 is driven at constant speed by a drive mechanism 44. To the left of these elements is positioned a multi-track magnetic record and playback head 45. The tape is held against this head by tension in the tape and by idler rollers 46 and 48. Positioned adjacent the record head is an erase head 50 which is operated during a recording operation to erase the tape prior to recording. Both playback and recording are carried out in the conventional way.

Carried on the same axle as drive sprocket 40 and rotatable at the same speed is a drum 52 upon which a punched card, such as card 20 or 30 can be mounted and the punched hole code thereon converted into electrical signals. To this end drum 52 has a cylindrical portion 54, which may be transparent, and upon the outer surface of which a card is wrapped. The card is indexed by a set of pins 56 which mate with index holes 24 along the edges of a card. Just beneath cylindrical portion 54 are a series of photocells 58 which, when a hole in a card passes by permitting light to shine through from a series of light bulbs (not shown) positioned in the space inside the drum, generate electrical pulses. This technique of reading a punched card is conventional.

With each revolution of drum 52, a full frame of magnetic tape 26 is passed over head 45. As will be explained, the electrical signals derived from the tape are compared with the signal derived from a punched card each revolution, and if the signals from the card coincide successively in time with corresponding ones from the tape a "match" signal at the end of the revolution of the drum is generated and used to turn on a light at the corresponding subscriber's box. To keep track of which frame along the tape is being read during any given revolution of drum 52, there is connected in fixed-driving relation to the axle on which this drum and sprocket 40 are mounted, a counter, generally indicated at 60.

Counter 60 comprises three multi-contact decks 61, 62, and 63, which are geared together so that deck 61 moves one switch position for each revolution of drum 52, deck 62 moves one switch position for each revolution of deck 61, and deck 63 moves one position for each revolution of deck 62. These decks serve as commutating switches and direct a "match" signal, described above, to the proper circuit to light the subscriber's box corresponding to the frame just read. Thus if frame 26 has just been read and a match signal obtained, the indicator light at box number 26 will be turned on. This operation can be carried on at high speed and it is possible to scan a tape holding the information on thousands of subscribers in less than a minute.

In this illustration of the invention a report card as shown in FIGURE 3 has a number of vertical columns, in any one of which a code hole 32 may appear. However, it is assumed that though the columns are divided into a number of horizontal rows, only one code hole at most will ever be placed in a given column. In the case of a subscriber's card, as shown in FIGURE 2, there may be holes in more than one row of a column since more than one type of report may be desired.

The tape and card reader shown in FIGURE 4 has a pickup head aligned with each vertical column of a card and of a frame of the tape. Each column is then scanned row by row as drum 52 rotates. Upon the coincidence of a pulse from, say, the first column of row one of a frame on the tape, with a pulse from column one, row one of card 30 (which for card 30 and frame 26 will be the case), an intermediate signal will be generated and stored. Similarly, the remaining columns of report card 30 are compared row by row with each frame on the tape and intermediate signals stored up. After the last row of the card has been scanned, if the proper intermediate signals have been received, a "match" signal is generated. Now, before the instant this signal is generated, counter 60 will have momentarily switched on a circuit leading to the indicator light at the subscriber's box corresponding to this frame. Therefore the match signal will energize the light at this box, and as explained above, this will indicate that a copy of the report corresponding to card 30 should be placed in this box.

As seen in FIGURE 4, to record the information on subscriber's card 20 on a frame of tape 26, the card is mounted on drum 52. Then the drum is rotated and the signals from photocells 58 are applied to a recording amplifier 70 and from thence to the individual channels of magnetic head 45. Since drum 52 and card 30 move in absolute synchronism with the tape, the exact pattern of information on the card will be recorded on a frame of the tape. The particular number of this frame is indicated by counter 60 and can be read by the person operating the machine, and thereafter written on the subscriber's card.

To issue a report, a report card is mounted on drum 52 and compared in the way explained above with each frame of the tape. Each row of the card is counted or kept track of by correspondingly spaced holes placed in an upstanding flange 72 of drum 52. These holes pass between a light and photocell pickup 74 and thus generate a signal as each row of the card is being scanned. The photocell pickups 58 are connected to respective ones of memory units 76, there being a memory for each pickup channel. Similarly, there are connected to the channels of magnetic head 45 respective ones of memory units 78. For each column of card 30, there is a corresponding pair of units 76 and 78. As will be explained, these pairs of memory units are arranged in three groups indicated by the dotted boxes.

Now, as each row of report card 30 is scanned, if a hole appears in any of the possible column positions, a signal will be generated and applied via an amplifier 75 to a corresponding one of units 76. Simultaneously, if a signal is also received from the tape, this signal will be applied via a playback amplifier 77 to a corresponding one of units 78. At the end of each row on the card a reset signal is received from photocell unit 74 and applied via an amplifier 80 to units 76 and 78 in pairs. If both units in a pair have received a signal, each will in turn apply a signal to an AND gate 82. The input of two signals to the AND gate causes an output signal to be emitted from it, which signal is applied either via one of OR gates 84 or directly to one of memory units 86, thereby setting it. Three such units 86 are shown, the first receiving signals from columns 1–3 of the card and tape, the next unit receiving from columns 4–11, and the third from the last column of the card and tape, column 12. In this illustration it is assumed that for each report card 30, there will be only one code hole 32 in the first three vertical columns, one hole in the next group of columns 4–11, and one hole in the last column. Accordingly, the circuit shown in FIGURE 4 has been designed to accommodate only this arrangement of code holes. Of course, to accommodate a hole in each column or to provide for additional columns, additional pickup channels and memory units can be provided as will be evident to those skilled in the art. The detailed construction and operation of these memory units and associates gates is conventional and will not be described further.

At the end of a card, all three memory units 86 may have been set, as described above. Then a reset signal from photocell unit 74 and an amplifier 88 will cause each unit 86, if it has been set, to apply a signal to an AND gate 90. If all three memory units 86 apply signals to this gate, it in turn will generate a "match" signal, previously mentioned, to an amplifier 92 and thence to counter 60 where this signal will be routed to a particular light in the bays of subscribers boxes. Each light circuit has associated with it a self-holding relay which can be turned on by the momentary match signal. At the end of issuing a report, all of the lights which have been lighted are turned off by actuating a reset unit 94. The circuit shown in FIGURE 4 is then conditioned for the next sequence of operations in issuing another report.

The system which has been described is not limited to handling the specific type of information illustrated. Also, more than one magnetic tape can be compared against a particular report card and in fact as shown in FIGURE 1, two tape transports, one the duplicate of the other, have been provided. Of course, if two tapes are simultaneously compared against a report card, two electronic circuits are necessary. In a system which has been built and successfully operated, drum 52 was rotated at about 2000 r.p.m. and a frame on the magnetic tape was 3 inches long. Thirteen bays of 144 boxes each were employed.

The above description of the invention is intended in illustration and not in limitation. Various changes in the embodiment illustrated may occur to those skilled in the art, and these can be made without departing from the spirit or scope of the invention as set forth.

I claim:

1. An information system of the character described comprising an erasable memory medium such as a magnetic tape, means to store on the medium in coded form items of information, means to compare a coded piece of information with each item in the memory, a plurality of indicating means located at a like plurality of physical locations corresponding respectively to each item in the memory, and control means actuated by the comparing means to actuate the indicating means at each location corresponding to an item in the memory whenever a match between the piece of information and said item occurs, whereby for each memory item there is a unique and easily recognized location at which physical documents and the like can be placed.

2. A report issuing system of the character described comprising an erasable memory medium, means to store on the medium in coded form items of information corresponding to subscribers who wish to receive various reports, means to compare a coded piece of information with each item in the memory, said coded piece of information corresponding to a particular report to be issued to certain subscribers, a plurality of indicating means located at a like plurality of physical locations corresponding respectively to each item in the memory, and means acting on signals from the comparing means to actuate the indicating means at each location corresponding to an item in the memory after a match between the piece of information and said item occurs, whereby for each memory item there is a unique and easily recognized location at which reports can be placed for subsequent distribution to the subscribers.

References Cited by the Examiner

UNITED STATES PATENTS

| 2,672,287 | 3/1954 | Reitfort | 235—61.7 |
| 2,763,432 | 9/1956 | York | 235—92 |
| 3,030,609 | 4/1962 | Albrecht | 340—172.5 |
| 3,090,942 | 5/1963 | Gruenz | 340—146.2 |

OTHER REFERENCES

Pages 58–61, August 1960, Smith et al., Control Device for Record Sensing, I.B.M. Technical Disclosure Bulletin, vol. 3, No. 3.

Pages 21–22, December 1959, Furman et al, Information Search System, I.B.M. Technical Disclosure Bulletin, vol. 2, No. 4.

ROBERT C. BAILEY, *Primary Examiner.*

DARYL W. COOK, *Examiner.*

P. J. HENON, *Assistant Examiner.*